United States Patent
Basset et al.

(10) Patent No.: US 6,235,837 B1
(45) Date of Patent: May 22, 2001

(54) ARTICLE INCLUDING A WELD LINE BASED ON A MIXTURE OF POLYAMIDE AND POLYOLEFIN

(75) Inventors: Dominique Basset; Alain Bouilloux, both of Bernay; Yves Le Du, Valailles, all of (FR)

(73) Assignee: Atofina (FR)

( * ) Notice: Subject to any disclaimer, the term of this patent is extended or adjusted under 35 U.S.C. 154(b) by 0 days.

(21) Appl. No.: 08/320,726

(22) Filed: Oct. 11, 1994

(30) Foreign Application Priority Data

Oct. 12, 1993 (FR) .................................................. 93 12130

(51) Int. Cl.$^7$ ..................................................... C08L 77/00
(52) U.S. Cl. ............................ 525/66; 525/179; 525/182; 525/183; 428/409
(58) Field of Search .............................. 525/66, 179, 183, 525/182; 428/409

(56) References Cited

U.S. PATENT DOCUMENTS

| | | | |
|---|---|---|---|
| 4,705,818 | * 11/1987 | Kawai et al. | 523/200 |
| 5,073,590 | * 12/1991 | Abe et al. | 524/449 |
| 5,140,059 | * 8/1992 | Simoens | 524/504 |
| 5,162,422 | * 11/1992 | Lausberg et al. | 524/504 |
| 5,206,284 | * 4/1993 | Fukui et al. | 524/504 |

FOREIGN PATENT DOCUMENTS

| | | |
|---|---|---|
| 0 342 066 | 11/1989 | (EP) . |
| 1-284785 | 6/1991 | (JP) . |

OTHER PUBLICATIONS

B. Fisa et al., Effect of an Ionomer Compatibilizer on the Structure and Mechanical Properties of Injection Molded PA6/HDPE Blends; ANTEC 1991; pp. 1135–1139.

* cited by examiner

Primary Examiner—Ana Woodward
(74) Attorney, Agent, or Firm—Pennie & Edmonds LLP

(57) ABSTRACT

The invention relates to an article based on a mixture of polyamide and polyolefin, which article includes at least one weld line due to multi-port injection molding, said article characterized in that the ratio of the viscosities of the polyolefin to the polyamide, measured at a shear rate higher than 100 s$^{-1}$, is greater than 0.70, and that the quantity of polyamide is sufficient for the elongation at break to be greater than 10%. A typical application is the production of an injection molded automobile fender.

4 Claims, No Drawings

ARTICLE INCLUDING A WELD LINE BASED ON A MIXTURE OF POLYAMIDE AND POLYOLEFIN

FIELD OF THE INVENTION

The present invention relates to articles of manufacture that are based on a mixture of polyamide and polyolefin resins. Such articles are made by multi-port injection molding processes, and as a result of these processes, the articles include a weld line. One of the preferred aspects of the present invention involves the configuration of such articles as automobile fenders.

BACKGROUND OF THE INVENTION

Polyamide polyolefin mixtures are known to combine the advantages of polyolefins (ease of injection molding, chemical resistance, insensitivity to moisture) and of polyamides (good mechanical properties).

Mixtures based on polyamide and polyolefin have been described in Patent Application publication EP 342066. Since polyamides and polyolefins are not very compatible, it is necessary either to graft a proportion of the polyolefin, for example with maleic anhydride (forming a maleinized polyolefin), or to add a third substance (compatibilizing agent). EP 342066 shows the advantage of some third substances for obtaining mixtures of polyamides and polyolefin which have good mechanical properties. However, if these mixtures of polyamide and polyolefin are employed for making articles which have a weld line, ruptures may occur along this line.

The weld line in an article is the meeting of two flows of molten polymers when the article is manufactured, for example by injection molding at two or more points in the mold. At the junction of two or more molten polymer flow fronts, characteristic regions are formed, called weld lines or knit lines. Injection molding of complex articles is practically impossible to carry out without weld lines.

The morphology and the mechanical properties of articles with weld lines differ substantially from those that are devoid of them. In general, the weld lines exhibit an orientation of the material which is parallel to the plane of welding, and give rise to a considerable embrittlement of the articles. In the case of mixtures of incompatible polymers the weld lines have particularly dramatic effects because of the heterogeneous nature of these materials. Increasing the temperatures of the mold and of the material does not suffice to improve appreciably the toughness of the weld lines.

An article by B. Fisa et al., "Effect of an Ionomer Compatibilizer on the Structure and Mechanical Properties of Injection molded PA6/HDPE Blends", which appeared in ANTEC '91, pages 1135–1139, describes the effect of a compatibilizing agent for improving the tensile strength of the weld lines. This agent is an ethylene/methacrylic acid/isobutyl acrylate copolymer. The methacrylic acid is 70% neutralized with zinc.

Patent Application JP 1 284785 of Nov. 2, 1989 published on Jun. 21, 1991 under no. JP 3146552 describes mixtures including 80 to 40% of polyamide, 1 to 40% of a modified polyolefin, and 20 to 60% of polypropylene and such that the ratio of the viscosity of the polypropylene to the viscosity of the polyamide is higher than 0.75 when these viscosities are measured at the molding temperature and at a shear rate of 3500 $s^{-1}$. These mixtures are particularly suitable for being painted or metallized. Nothing is mentioned concerning the behaviour of weld lines.

SUMMARY OF THE INVENTION

A new mixture of polyamide and polyolefin has now been-found which has a satisfactory elongation at break at the weld lines. This elongation may be obtained without the use of a compatibilizing agent. When such an agent is employed, the present invention allows a great degree of latitude in its selection.

The present invention makes it possible to solve to a large extent the problems linked with the process of injection molding of polyamide/polyolefin mixtures, in particular improving the behaviour of the weld lines and reducing the phenomenon of surface delamination. Furthermore, injection-molded articles made in accordance with the present invention have improved mechanical properties.

The present invention includes an article that is based on a mixture of polyamide and polyolefin and that has at least one weld line, characterized in that:
  the ratio of the viscosities of the polyolefin to the polyamide, measured at a shear rate higher than 100 $s^{-1}$, is greater than 0.70,
  the quantity of polyamide is sufficient for the elongation at break to be greater than 10 percent.

Thus, in one aspect, the present invention provides an article of manufacture made by injection-molding a resinous mixture comprising polyamide and polyolefin through two or more mold ports wherein (a) the relative amount of polyamide resin in said resinous mixture is from 58–75 weight-percent and (b) the elongation at break of said article is greater than 10%.

Another aspect of the present invention relates to articles of manufacture made by injection-molding resinous mixtures through two or more mold ports wherein said resinous mixtures comprise from 60–70 weight-percent polyamide, from 20–30 weight-percent polyolefin, from 3–10 weight-percent compatibilizing agent, and optionally approximately 10 weight-percent of a shock resistance agent.

Still another aspect of the present invention is a method of making an automobile fender which comprises providing an openable mold comprising a cavity having the shape of the automobile fender to be made and a plurality of injection ports, providing a resinous mixture comprising from 60–70 weight-percent polyamide, from 20–30 weight-percent polyolefin, and from 3–10 weight-percent compatibilizing agent in a reservoir outside of said mold cavity, heating said resinous mixture to a temperature sufficiently high to maintain said mixture in a flowable condition, injecting the flowable mixture into the mold cavity via the plurality of injection ports, cooling the mold and resinous mixture to a temperature sufficiently low to maintain said mixture in a solid condition, opening said mold, and removing the solid resinous mixture in the form of an automobile fender.

Finally, in order to accomplish aspects thereof such as those outlined above, the present invention makes use of various novel compositions of matter. Among them are compositions of matter comprising 60–70 weight-percent polyamide resin, 20–30 weight percent polypropylene, 3–10 weight-percent maleinized polypropylene grafted with polyamide, and optionally about 10 weight-percent maleinized ethylene-propylene copolymer.

DESCRIPTION OF THE PREFERRED EMBODIMENTS

The resinous mixture according to the present invention comprises a polyamide matrix. Any polyamide may be employed. Nylon polyamides such as PA6, PA66, PA11, and PA12 have been found to be particularly suitable.

A person skilled in the art can determine the quantity of polyamide to obtain an elongation at break higher than 10%. For example, if PA6 or 66 is employed, the mixture must contain at least 58% by weight of polyamide and preferably will contain 60 to 70%.

The polyolefin may be polyethylene, polypropylene, their copolymers, or ethylene/butene copolymers, and the like. Polypropylene homopolymer or copolymer is advantageously employed, for example block or statistical propylene/ethylene copolymers and propylene/butene copolymers. Polypropylene is currently the preferred polyolefin. Most preferred are polypropylenes having a melt flow index (MFI), measured at 230° C./2.16 kg, lower than 0.5.

The polyolefin may be a wholly or partially modified polyolefin. It may be, for example, a polyolefin that has at least one functional group chosen from carboxylic acids, carboxylic esters, acid anhydrides, and epoxy groups, for example the following copolymers: ethylene/alkyl (meth) acrylate, ethylene/alkyl (meth)acrylate/maleic anhydride, ethylene/alkyl (meth)acrylate/glycidyl (meth)acrylate, ethylene/vinyl acetates ethylene/vinyl acetate/maleic anhydride, ethylene/vinyl acetate/glycidyl (meth)acrylate, ethylene/vinyl acetate grafted with maleic anhydride, ethylene/alkyl (meth)acrylate grafted with maleic anhydride, and homo- or copolyolefins optionally grafted with maleic anhydride.

The viscosities that characterize the components of the resinous mixtures in accordance with the present invention are determined at the temperature and at the shear rate which correspond to the conditions for processing the mixture. The shear rate is typically higher than 100 $s^{-1}$ and preferably between 300 and 5000 $s^{-1}$. The processing temperature is between 240 and 290° C. The ratio of the viscosities is advantageously between 0.75 and 1.1 and most preferably between 0.9 and 1.1.

It is also possible to add a compatibilizing agent to the mixture of polyamide and polyolefin. Thus, in accordance with the present invention, it is possible to have mixtures such as the following: polyamide/polyolefin/optional compatibilizing agent, polyamide/modified polyolefin/compatibilizing agent, polyamide/polyolefin/modified polyolefin/compatibilizing agent. The compatibilizing agent may be an alpha-monoolefin graft copolymer, such as maleinized polypropylene grafted with polyamide (PA6, PA11, PA12 oligomer or homopolymer, PA66/12 copolymer). These products are described in EP 342066.

Other modified polyolefins with compatibilizing properties may be suitable, in particular: maleinized polypropylene (degree of maleination≧0.5%), statistical polyethylene/polypropylene copolymer (EPR), maleinized (degree of maleination≧0.5%), styrene-ethylene/butylene-styrene (SEBS) block terpolymer, maleinized (degree of maleination≧0.5%), grafted or not with PA6, and ethylene/propylene/diene monomer (EPDM), EPDM (degree of maleination≧0.5%).

The quantity of polyamide may be between 58 and 75 percent, preferably 60 to 70. The quantity of polyolefin or modified polyolefin may be between 25 and 42 percent. The quantity of optional compatibilizing agent may be between 0 and 15 percent. Especially preferred are resinous mixtures of polyamide/polypropylene/maleinized polypropylene grafted with polyamide including: 60 to 70 percent polyamide, 20 to 30 percent polypropylene, and 3 to 10 percent maleinized polypropylene grafted with polyamide.

The above mixtures may contain shock resistance agent (SR) in a concentration lower than 15%, expressed relative to the total weight of the mixture of polyamide/polyolefin and/or modified polyolefin/optional compatibilizing agent/shock resistance agent. The concentration of shock resistance agent in the mixture is preferably 10%, and the SR may comprise such materials as: maleinized EPR (degree of maleination≧0.5%), maleinized SEBS (degree of maleination≧0.5%), maleinized EPDM (degree of maleination≧0.5%).

The present invention also contemplates the addition of additives such as glass fibres, flame retardants, antioxidants, and the like and conventional fillers to the mixtures employed.

After injection molding, the mixtures thus produced exhibit a nodular dispersed phase throughout the thickness of the articles and in the weld regions. This homogeneous morphology appreciably improves articles made from the mixtures according to the invention with respect to behaviour of the weld lines, impact strength, and delamination.

EXAMPLES

Measurements of the melt viscosity of the polypropylene and of the polyamide are determined with a capillary viscometer, at a temperature of between 240 and 290° C. The ratios of viscosities ηpolypropylene/ηpolyamide are given for a shear rate of 600 $s^{-1}$. The proportions are by weight. The compatibilizing agent is referenced in the Tables hereinbelow as "TC".

Mixtures were produced in a Werner extruder. The stock temperature along the barrel was between 240° C. and 290° C., the speed of rotation of the screw was 150 revolutions/minute, and the stock flow rate was 20 kg/hour. In order to demonstrate the properties of articles injection molded in accordance with the present invention, stardard ISO R 527 dumbbells, 150×10×4 mm in size were then manufactured by injection at the two ends of the mold, so as to produce a weld line in the centre. The screw speed of the injection press is between 10 and 400 revolutions/minute. The injection speed is between 5 and 50% of the nominal speed. The temperature of the mold is between 50° C. and 90° C. The stock temperature depends on the nature of the polyamide and is between 240° C. and 290° C.

The morphology of the mixtures in the weld regions is observed by scanning electron microscopy (SEM) on lengthwise sections produced by cryomicrotomy and after selective extraction of the polyolefin phase with boiling xylene. Using image analyses, the number-average diameters (Dn) and volume-average diameters (Dv) and the polydispersity index (Ip=Dv/Dw) are measured when the particles can be assumed to be like spheres.

The behaviour of the weld lines is evaluated by a tensile test according to the specifications of ISO standard R 527 (5 test pieces per batch). The elongation at break is determined.

The tendency to delamination is determined qualitatively by observing the surfaces of the articles by scanning electron microscopy after the application and then peeling of an adhesive film.

The multiaxial impact strength and abrasion resistance of some mixtures are also evaluated on 100×100×2 mm plaques under the following conditions.

The multiaxial impact tests are carried out according to ISO standard 6603-2. The impact diameter is 20 mm, the restraint diameter is 40 mm, and the speed is 4 m/s. The maximum force (in Newtons) and the total rupture energy (in Joules) are measured at different temperatures (23° C., 0° C., −20° C.).

The abrasion tests are carried out according to standard NFT 54351 on the Taber abrasimeter model 503, by measuring the loss in weight at ambient temperature. The mill wheel is calibrated H8, the speed is 60 rev/min, the applied load is 500 g, and the number of cycles is 1000 revolutions.

Examples 1 to 5

The composition and the rheological characteristics of the mixtures which form the subject of the invention (Ex. 1 to 5) and of the mixtures employed as references (Ex. A to D) appear in Table 1.

TABLE 1

| Examples | PA6/PP/TC mixture | ηPP/ηPA | PP MFI | TC Compatibilizing agent |
|---|---|---|---|---|
| 1 | 68/28/4 | 1 | 0.3 | Maleinized PP |
| 2 | 65/27/8 | 1 | 0.3 | Mal. PP g. PA6 |
| 3 | 65/30/4 | 1 | 0.3 | Mal. PP g. PA6 |
| 4 | 65/27/8 | 1 | 0.3 | Mal PP g. PA6 |
| 5 | 65/27/8 | 1 | 0.3 | Mal. PP g. PA66/12 |
| A | 57/33/10 | 0.5 | 4 | Maleinized PP |
| B | 57/33/10 | 0.5 | 4 | Maleinized SEBS |
| C | 57/33/10 | 0.5 | 4 | Mal. PP g. PA6 |
| D | 57/33/10 | 1 | 0.3 | Mal. PP g. PA6 |

In Examples 1 to 5, the polyamide 6 (PA6) is Ultramid B3 (BASF), in a weight content higher than or equal to 65%. The polypropylene is Finasphere 1030 S (Fina) of MFI equal to 0.3. The ratio of the viscosities ηpolypropylene/ηpolyamide at 600 s$^{-1}$ and 240° C. is equal to 1.

The mixtures are compatibilized with different copolymers in weight contents of between 4 and 8%. (TC denotes the compatibilizing agent in Table 1).

Ex. 1: 1% maleinized polypropylene (Orevac CA 100, sold by Elf Atochem)

Ex. 2 and Ex. 3: 1% maleinized polypropylene, grafted with PA6 oligomer of Mn=1500, Ex. 4: 1% maleinized polypropylene, grafted with PA6 homopolymer Ultramid B3 (BASF), Ex. 5: 1% maleinized polypropylene, grafted with PA66/12 copolymer.

In Ex. A to D the polyamide 6 is Ultramid B3 (BASF) in a weight content of 57%. In Examples A to C the polypropylene is 3050 MN1 (Appryl), of MFI equal to 4. In Example D the polypropylene is Finasphere 1030 S. The ratio of the viscosities ηpolypropylene/ηpolyamide is equal to 0.5 in Examples A to C and equal to 1 in Example D. The mixtures are compatibilized with different copolymers in a weight content of 10%:

Ex. A: 0.5% maleinized polypropylene (Exxelor PO 1015, sold by Exxon)

Ex. B: maleinized SEBS (Kraton FG 1901 X, sold by Shell)

Ex. C: 1% maleinized polypropylene, grafted with PA6 oligomer of Mn=1500,

Ex. D: 1% maleinized polypropylene, grafted with PA6 oligomer of Mn=1500.

The compared performances of the articles appear in Table 5. Examples 1 to 5 show that no surface delamination takes place, when compared with Examples A to D.

In Examples 1 to 5, furthermore, it can be seen that the orientation of the particles at the weld lines is low, which is reflected in a good tensile behaviour of the weld lines, in particular when a maleinized polypropylene copolymer grafted with PA6 with a content of 8% is employed (Ex. 2 and 4). With maleinized polypropylene grafted with PA6 oligomer (Ex. 2) the elongation at break reaches 138%. This result can be explained by the fineness and the homogeneity of the dispersed phase (Ip=1.9), which are obtained with this compatibilizing agent. By way of comparison, with the formulae of Ex. A and D the orientation of the particles in the weld lines is high, and this is reflected in a very poor mechanical behaviour. In Examples A, B, and C, the elongation at break is lower than 5%. In Example D it is shown that the fact of increasing the ratio of viscosities to 1 without modifying the composition makes it possible to improve slightly the behaviour of the weld lines (elongation at break=8%), without, however, reaching the performances of the formulations of Examples 1 to 5. Example 2 shows, moreover, that the multiaxial impact strength at low temperature (0° C.) and the abrasion resistance are very markedly improved, when compared with Example C.

Example 6

Automobile Fender

The composition and the Theological characteristics of the impact-reinforced formulations employed for the injection-molded vehicle body component applications (car fender), which form the subject of the invention (Ex. 6) and of the Comparative Ex. E, appear in Table 2.

TABLE 2

| Examples | PA66/PC/TC/SR mixture | ηPP/ηPA | PP MFI | TC/SR |
|---|---|---|---|---|
| 6 | 65/20/5/10 | 1 | 0.3 | Mal. PP g. PA6/mal. EPR |
| E | 59/23/9/9 | 0.5 | 4 | Mal. PP g. PA6/mal. EPR |

In Ex. 6 the polyamide is Vidyne 21 X (Monsanto) in a weight content of 65%. The polypropylene is Finasphere 1030 S. The ratio of the viscosities ηpolypropylene/ηpolyamide at 600 s$^{-1}$ and 280° C. is equal to 1. The mixture is compatibilized with 1% maleinized polypropylene copolymer grafted with PA6 oligomer of Mn=1500, in a weight content of 5%. The shock resistance agent (SR) employed is approximately 1% maleinized EPR (Exxelor VA 1803), in a weight content of 10%.

In Ex. E, the polyamide 66 is Vidyne 21 X in a weight content of 59%. The polypropylene is 3050 MN1. The ratio of the viscosities ηpolypropylene/ηpolyamide is equal to 0.5. The mixture is compatibilized with 1% maleinized polypropylene copolymer grafted with PA6 oligomer of Mn=1500 in a weight content of 9%. The shock resistance agent (SR) employed is Exxelor VA 1803, in a weight content of 9%.

The compared performance of the articles appear in Table 6. Example 6 shows that the orientation of the particles at the weld line is low, which is reflected in a good tensile behaviour of the weld line. The elongation at break reaches 60%. In comparison, with the formulation of Ex. E, the orientation of the particles in the weld line is high and the elongation at break is lower than 5%.

Example 6 shows, furthermore, that the multiaxial impact strength at low temperature (−20° C.) and the resistance to delamination are very markedly improved, in comparison with Example E.

TABLE 5

| Examples No. | Particle ηPP/ηPA | orientation | Dn Microns | Dv Microns | Ip | Elong. break % | Surface Delamination | Multiaxial Impact max. F | max. E | Abrasion mg |
|---|---|---|---|---|---|---|---|---|---|---|
| 1 | 1 | weak | 1.9 | 21.3 | 13.2 | 34 | no | | | |
| 2 | 1 | weak | 2 | 3.8 | 1.9 | 138 | no | 2680 (0° C.) | 8.83 (0° C.) | 59 |
| 3 | 1 | weak | | | | 25.6 | no | | | |
| 4 | 1 | weak | 1.3 | 12.2 | 9.4 | 85 | no | | | |
| 5 | 1 | weak | 3.8 | 7.1 | 1.9 | 21.6 | no | | | |
| A | 0.5 | high | — | — | — | <5 | yes | | | |
| B | 0.5 | high | — | — | — | <5 | yes | | | |
| C | 0.5 | high | — | — | — | <5 | yes | 481.8 (0° C.) | 1.3 (0° C.) | 90 |
| D | 1 | high | — | — | — | 8 | yes | | | |

TABLE 6

| Examples No. | Particle ηPP/ηPA | orientation | Elong. break % | Surface Delamination | Multiaxial Impact max. F | max. E |
|---|---|---|---|---|---|---|
| 6 | 1 | weak | 60 | no | 6300 (−20° C.) | 32 (−20° C.) |
| E | 0.5 | high | <5 | yes | 680 (−20° C.) | 1 (−20° C.) |

Example 7

The composition and the rheological characteristics of the formulation which forms the subject of the invention (Ex. 7) and of the formulations employed by way of comparison (Ex. F and G) appear in Table 3.

TABLE 3

| Examples | PA66/PP/TC/SR mixture | ηPP/ηPA | PP MFI | TC/SR |
|---|---|---|---|---|
| 7 | 65/20/5/10 | 1 | 0.3 | Mal. PP g. PA6/mal. EPR |
| F | 52/30/9/9 | 0.5 | 4 | Mal. PP g. PA6/mal. EPR |
| G | 59/25/7/9 | 1 | 0.3 | Mal. PP g. PA6/mal. EPR |

In Ex. 7 the polyamide 6 is Ultramid B3 in a weight content of 65%. The polypropylene is Finasphere 1030 S. The ratio of the viscosities ηpolypropylene/ηpolyamide at 600 s$^{-1}$ and 240° C is equal to 1. The mixture is compatibilized with 1% maleinized polypropylene copolymer grafted with PA6 oligomer of Mn 1500, in a weight content of 5%. The shock resistance agent (SR) employed is Exxelor VA 1803, in a weight content of 10%.

In Examples F and G the polyamide 6 is Ultramid B3 in a weight content of 52% (Ex. F) and 59% (Ex. G). The polypropylene is 3050 MN1 (Ex. F) and Finasphere 1030 S (Ex. G). The ratio of the viscosities ηpolypropylene/ηpolyamide is equal to 0.5 (Ex. F) and equal to I (Ex. G). The mixtures are compatibilized with 1% maleinized polypropylene copolymer grafted with PA6 oligomer of Mn=1500 in a weight content of 9%. The shock resistance agent (SR) employed is Exxelor VA 1803 in a weight content of 9% (Ex. F) and 7% (Ex. G).

The compared performances of the articles appear in Table 7.

TABLE 7

| Examples No. | ηPP/ηPA | Particle orientation | Elong. break % | Surface Delamination |
|---|---|---|---|---|
| 7 | 1 | weak | 12 | no |
| F | 0.5 | high | <5 | yes |
| G | 1 | high | <5 | yes |

Example 7 shows that the orientation of the particles at the weld line is low and that the behaviour of the weld line reaches 12% of elongation at break. By way of comparison, with Ex. F and G the orientation of the particles in the weld line is high and the elongation at break is lower than 5%. The fact of increasing the viscosity ratio to 1 without modifying the composition (Ex. G) does not improve the performance of the mixture.

Example 7 shows, furthermore, that the delamination is eliminated, in comparison with Example F.

Examples 8 to 10

The composition and the Theological characteristics of the mixture which forms the subject of the invention appear in Table 4.

TABLE 4

| Examples | PA6/PP/TC mixture | ηPP/ηPA | PP MFI | TC | Screw Speed rev/min |
|---|---|---|---|---|---|
| 8 | 65/27/8 | 1 | 0.3 | Mal. PP g. PA6 | 160 |
| 9 | 65/27/8 | 1 | 0.3 | Mal. PP g. PA6 | 250 |
| 10 | 65/27/8 | 1 | 0.3 | Mal. PP g. PA6 | 400 |

The polyamide 6 is Ultramid B3 in a weight content equal to 65%. The polypropylene is Finasphere 1030 S. The ratio of viscosities ηpolypropylene/ηpolyamide is equal to 1. The mixture is compatibilized with 1% maleinized polypropylene grafted with PA6 oligomer of Mn=1500 in a weight content of 8%. The dumbbells are injection-molded with different screw speeds of the injection press.

TABLE 8

| Examples No. | ηPP/ηPA | Screw speed rev/min | Particle orientation | Elong. break % | Surface Delamination |
|---|---|---|---|---|---|
| 8 | 1 | 160 | weak | 27.5 | no |
| 9 | 1 | 250 | weak | 17.5 | no |
| 10 | 1 | 400 | weak | 18.6 | no |

Examples 8 and 9 show that the behaviour of the weld lines is improved when the screw speed decreases.

While the present invention has been described with reference to various specific embodiments thereof, those skilled in the art will readily conceive of other means to accomplish the ends of the invention based upon the descriptions and explanations herein. Accordingly, the scope of the invention patented is to be construed by the spirit of the invention as reflected in the appended claims.

What is claimed is:

1. An article of manufacture comprising per hundred parts by weight a mixture of (i) 65 to 68 parts by weight of polyamide, (ii) 20 to 30 parts by weight of a polypropylene having a melt flow index, measured at 230° C./2.16 kg, lower than 0.5, and (iii) 4 to 8 parts by weight of a resin compatibilization agent selected from the group consisting of maleinized polypropylene, maleinized polypropylene grafted with PA6, and maleinized polypropylene grafted with PA66/12 and including at least one weld line, wherein (a) the ratio of the viscosities of the polyolefin (ii) to the polyamide (i), measured at a shear rate higher than $100\ s^{-1}$, is greater than 0.70, and (b) the quantity of polyamide (i) is sufficient for the elongation at break of said article to be greater than 10%.

2. The article of manufacture of claim 1 wherein the ratio of the viscosities is between 0.75 and 1.2.

3. The article of manufacture of claim 1 wherein the ratio of the viscosities is between 0.9 and 1.1.

4. The article of manufacture of claim 1 wherein said article is made in the form of an automobile fender by injection molding.

* * * * *